April 1, 1930.　　　　C. B. MILLS　　　　1,753,155
SHIP'S WHISTLE
Filed Sept. 25, 1924　　　2 Sheets-Sheet 1
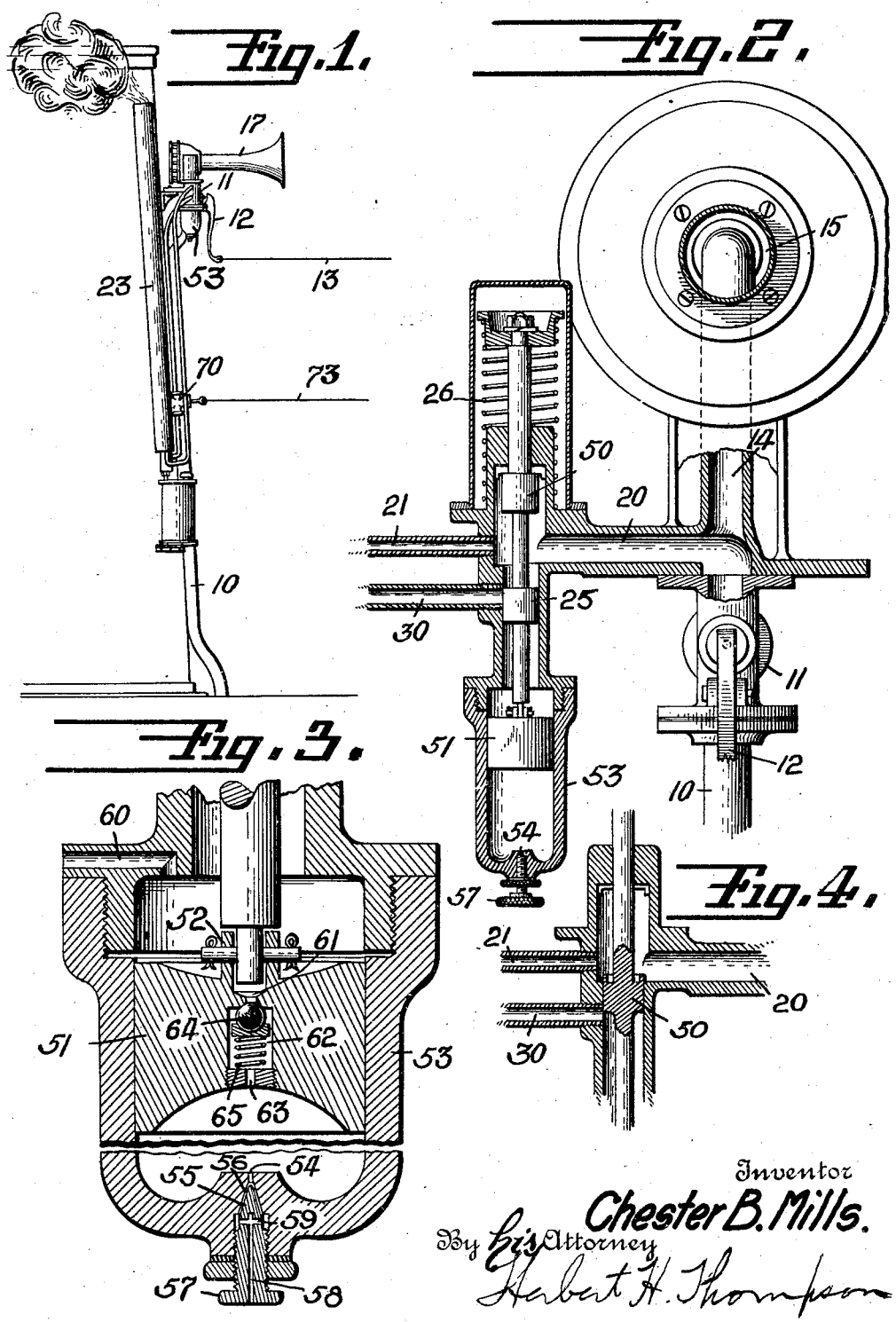
Inventor
Chester B. Mills.
By his Attorney
Herbert H. Thompson April 1, 1930.                C. B. MILLS                 1,753,155
                             SHIP'S WHISTLE
                         Filed Sept. 25, 1924        2 Sheets-Sheet 2
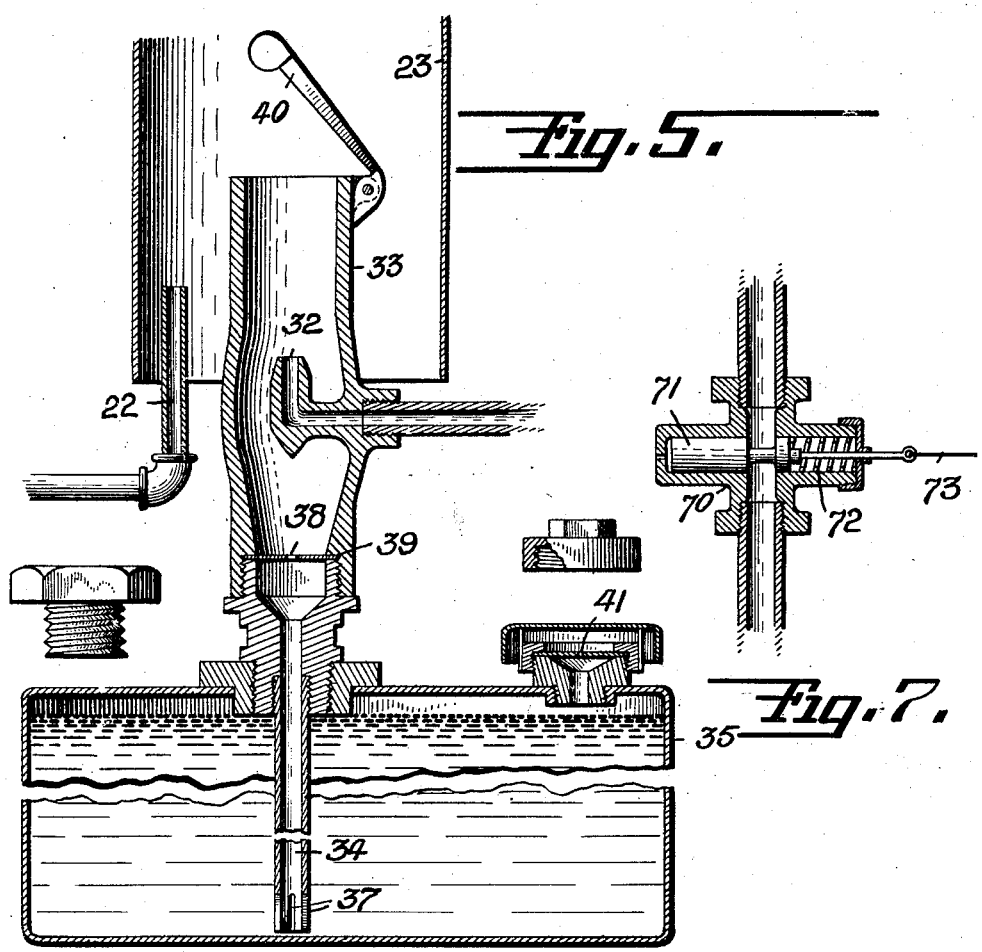
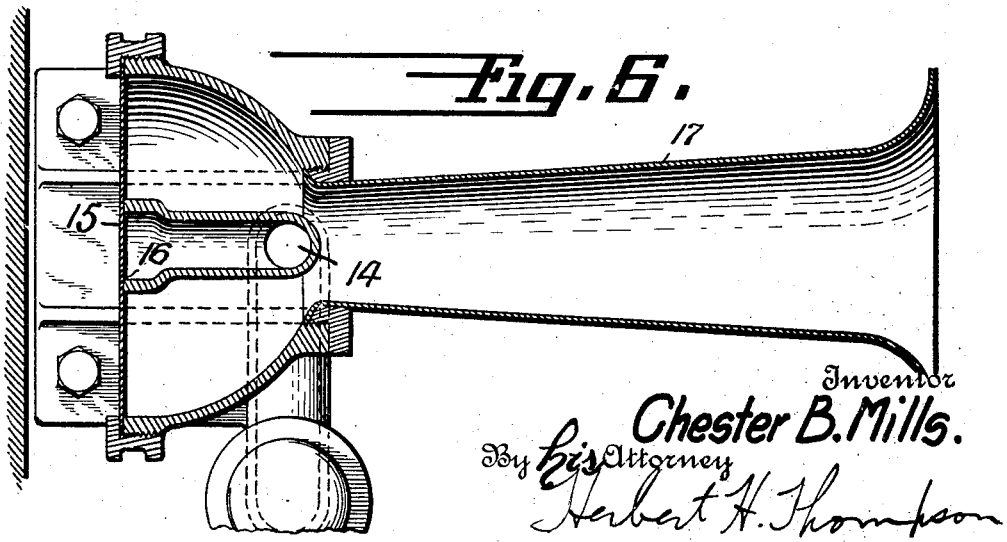
Inventor
Chester B. Mills.
By his Attorney
Herbert H. Thompson Patented Apr. 1, 1930

1,753,155

UNITED STATES PATENT OFFICE

CHESTER B. MILLS, OF BROOKLYN, NEW YORK, ASSIGNOR, BY MESNE ASSIGNMENTS, TO SPERRY GYROSCOPE COMPANY, INC., A CORPORATION OF NEW YORK

SHIP'S WHISTLE

Application filed September 25, 1924. Serial No. 739,787.

This invention relates to signals or whistles of the type carried by ships. It is well known that other vessels rely not only upon the sound of the signal to ascertain its source but also upon its visibility and indeed the latter factor is considered the more important. In steam vessels the whistle is operated by steam which is, of course, visible especially against the smoke stack, which is its usual back ground. The introduction of the non-steam driven ships, such for example as those driven by Diesel engines, has created a problem in that the signal not being operated by steam is no longer visible. This invention has for its principal object, therefore, the provision of a whistle or signal provided with means for rendering the source thereof visible upon vessels and in other places where steam is not available as the operating medium.

It is a further object of my invention to employ a single operating medium such as compressed air for actuating both the sound signal or whistle and the visibility mechanism.

A further object of my invention is the provision of a whistle in combination with means for rendering the source of sound visible as described above, and means whereby the visibility mechanism may be actuated during only a portion of the period that the whistle is effective so that the materials producing the visibility may be economized.

A further object of the invention is the provision of a visibility mechanism as descrbed in the preceding paragraph which can be rendered effective as rapidly as may be required, by the rapid successive operation of the whistle.

A further object is the provision of the visibility mechanism and means as described above which shall employ a substance capable of producing a visible cloud or visible fume upon being ejected into or otherwise mixed with air. Preferably such visibility producing substance should not crystallze readily upon the surroundng mechansm or structure to mar and disfigure said structure and should not clog the ejecting passages. Means are also preferably provided for preventing mixture of air with the visibility producing substance when the visibility mechanism is not in operation.

Other objects and advantages of this invention will become apparent in the following detailed description of the invention. In the accompanying drawings Fig. 1 is a side perspective view showing the general arrangement of my visible signal.

Fig. 2 is an enlarged view, partly sectioned, and with parts broken away, of the horn and the means for controlling the actuation of the visibility mechanism.

Fig. 3 is an enlarged detailed view of the timing mechanism shown in Fig. 2 for controlling the visibility mechanism.

Fig. 4 is a detail showing the actuating member of the visibility control mechanism of Fig. 2 in another operating position.

Fig. 5 is an enlarged sectional view of the visibility mechanism.

Fig. 6 is a sectional view of the horn or sound producing part of my visible signal.

Fig. 7 is a section through a control valve.

Referring to the drawings, there is shown in Fig. 1 what I call my visible signal, which, in the present instance, comprises a sound producing mechanism and a means for rendering the position of said mechanism visible. The sound producing mechanism comprises a source of energy, which, in the present instance, may be compressed air supplied through a pipe 10 and controlled in the usual manner by a valve 11 actuated by a suitable lever or actuating member 12, which may be operated from a distance by a cable 13. When the valve 11 is opened by lever 12 the compressed air passes upwardly through passage 14 into engagement with a diaphragm 15 abutting against a seat 16. The compressed fluid moves the diaphragm rapidly away from its seat allowing air to pass between said seat and the diaphragm out through the horn 17.

The pressure thus supplied is not entirely utilized in actuating the diaphragm 15, but is deflected through a branch passage 20 to actuate the visibility mechanism. A small portion of the compressed fluid diverted through passage 20 passes through side passage 21 of scavenging passage 22 for the purpose of scavenging the tube 23 through which the visibility producing substance is ejected. The remainder of the compressed fluid acts upon a piston 25 against the action of a spring 26 to force said piston downwardly until passage 30 is uncovered. Passage 30 is then in communication with passage 20 and the compressed air will be forced therethrough at relatively high pressure to a nozzle 32. Said nozzle is positioned within a tube 33, the upper end of which extends into the ejecting tube 23. The compressed fluid is forced out of nozzle 32 at high pressure thus creating a partial vacuum in tube 33 which at its lower end is in communication with a tube 34 extending into a reservoir 35, in which the visibility producing substance is retained. The tube 34 is provided with a plurality of openings 37 adjacent its lower end so that a predetermined quantity of said substance will be sucked through a pipe 34 and through a small opening 38 in a baffle plate 39, said opening serving to partially atomize the visibility producing fluid. This fluid may be any substance, which, upon contact with air, will produce a vapor or fume that is visible. In the present instance I have chosen an anhydrous chloride of the tin group, which, upon mixture with air, forms a dense, white fume. This visible fume will be carried upwardly by the pressure of the compressed fluid passing out of nozzle 32 and will pass upwardly through the top of the tube 23 which may be positioned preferably against the smoke stack as its back ground. The scavenging tube 22 will keep the tube 23 normally free of visible fume or crystalline particles and will prevent deposit of solid material on the walls thereof.

When the whistle is shut off, there will be no fluid under pressure supplied through nozzle 32 and a cover 40 hinged at one end so as to be normally acted upon by gravity will close the top of tube 33 to prevent the passage of air downwardly into the visibility forming substance. The baffle plate 39 and the small opening 38 therein also prevents the passage of air therethrough when not in use and prevents the crystallization of the unused stannic chloride in the tube 34, because the said stannic chloride will form a light film over or adjacent the opening 38, which, due to the thinness of plate 39 will also be very thin so that it is easily broken when suction is applied to the fluid therebeneath by nozzle 32. A vent 41 of suitable construction may be applied to the reservoir 35.

The piston 25 will continue to descend while the valve 11 is open until a second piston 50, formed integral therewith, has descended far enough to cut off communication between passage 20 and pipe 30 as shown in Fig. 4. The whistle will continue to operate for the purpose of emitting a sound but the visibility mechanism will no longer be effective so that the said visibility mechanism is caused to operate during only a portion of the period of operation of the sound signal. The length of time during which the visibility mechanism will operate depends, of course, upon the time it takes for piston 50 to descend into position to cut off communication between passages 20 and 30. This time may be regulated by a timing mechanism shown in greater detail in Fig. 3. To the stem which carries pistons 25 and 50, I attach a piston 51 by any suitable means such as a universal joint 52 shown in Fig. 3, said piston 51 operating in a cylinder 53 having an outlet 54 in the lower portion thereof through which the said piston expels the air as it descends. A conical valve 55 operates within the conical opening 56 terminating in opening 54, said valve 55 being adjustable into and out of said opening 56 to vary the size of the outlet formed between said conical valve 55 and the walls of the opening 56. The valve 55 may be operated by a suitable adjustable nut 57 threaded into the bottom of the wall of casing 53. In this manner it will be apparent that the rate of descent of pistons 25, 50 and 51 will vary according to the size of the outlet adjustably controlled by valve 55. The air may pass outwardly through a central bore 58 formed through the nut 57 and communicating by passage 59 with the outlet formed between the cone 55 and the opening 56.

When the valve 11 is shut off, it is desirable that the visibility control mechanism, comprising the valves 25, 50 and 51, be restored to its initial position as quickly as possible to be ready for the next actuation of the whistle so that it may produce a visible signal at the very beginning of the audible signal. To permit rapid actuation of the visibility control mechanism to its initial position, I provide means for admitting air to the chamber 53 below the piston 51 at a faster rate than could be admitted through passages 58, 59, 56 and 54 through which the air had previously been expelled. This means may include an inlet 60 in the upper wall of the chamber 53 and air passages 61, 62 and 63 extending downwardly centrally through piston 51 to the underside thereof. To keep said central passages closed during the descent of piston 51 there may be provided a ball valve 64 normally pressed against the seat of opening 61 by a spring 65. In the upward stroke, however, the incoming air from inlet 60 and passage 61 forces the valve 64 away from its seat against the action of spring 65 to permit the air to pass centrally through the piston to the underside thereof, thus increasing the pressure on said underside and assisting in quickly restoring the visibility control mechanism to its upward or initial position.

The fundamental principles of my invention may be applied to steamships employing steam whistles. In the daytime, the ship that is blowing its whistle may be readily ascertained at a distance because of the visible steam. At night, however, this is not the case, and in order to make clear which ship is whistling, I may provide a light preferably adjacent the emitted steam, and adapted to be illuminated simultaneously with the blowing of the whistle in a single operation. The light may be permitted to glow during the entire period of the blast or for a fraction of said period.

It will be further understood that instead of the visible fume which I have described, I may employ any other visible signal, such as a light.

It may be desirable to stop the production of visible clouds at times, either because of heavy fog which renders it ineffective, or because a light is to be used instead, or for some other reason. For this purpose I may provide a valve 70 preferably in the pipe line 20, as shown in Fig. 1. If desired, means may be provided for operating said valve from the pilot-house. One form of accomplishing this result is illustrated in Fig. 7 in which the valve is shown as provided with a plunger 71 normally pressed, as by a spring 72, to open position, said plunger having connected thereto a cable 73 leading into the pilot-house. By pulling upon said cable, the plunger is moved against the action of spring 72 to close the passage through the compressed air pipe and shut off the supply of air and, hence, the production of the visible fume. To maintain the valve in closed position any suitable means such as a hook and ring may be provided for holding the cable against retraction.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A signal for ships and the like comprising a sound-producing mechanism adapted to be actuated by fluid under pressure for producing sound without visibility, a source of fluid under pressure, means adapted to become visible when mixed with said fluid under pressure, means whereby said fluid under pressure may be supplied to said mechanism and to said first means in the same operation, and means whereby said fluid under pressure is effective upon said first means during only a portion of the time that said fluid is effective to operate said mechanism.

2. A signal for ships and the like comprising a sound-producing mechanism, a visible signal-producing mechanism, a single actuating means for both mechanisms, and means whereby said actuating means actuates said first mechanism for a longer period than said second mechanism.

3. A signal for ships and the like comprising a sound-producing mechanism, a visible signal-producing mechanism, a single actuating means for both mechanisms, and means whereby said actuating means actuates said first mechanism for a longer period than said second mechanism, said last-named means including a control mechanism between said actuating means and said visible signal-producing mechanism and adapted to be actuated by said actuating means.

4. A signal for ships and the like comprising a sound-producing mechanism adapted to be actuated by compressed air, means adapted to form a visible fume when mixed with air, a tube through which said fume may be ejected, a source of compressed air, means for supplying compressed air to said mechanism, means for diverting to said first means a portion of the air supplied to said mechanism so as to form said fume and eject the same through said tube, and means for diverting to said tube still another portion of the air supplied to said mechanism for scavenging said tube.

5. A signal for ships and the like comprising means adapted to form a visible fume when mixed with air, a tube, a source of air under pressure, and means for supplying air to said first means and for ejecting the fume through said tube.

6. A signal for ships and the like comprising means adapted to form a visible fume when mixed with air, a tube, a source of air under pressure, means for supplying air to said first means and for ejecting the fume through said tube, and means for supplying air to said tube for scavenging the same.

7. A signal for ships and the like comprising means adapted to form a visible fume when mixed with air, a tube, a source of air under pressure, means for supplying air to said first means and for ejecting the fume through said tube, and means for diverting to said tube a portion of the air supplied to said first means for scavenging said tube.

8. A signal for ships and the like comprising a sound-producing mechanism adapted to be actuated by compressed air, means adapted to form a visible fume when mixed with air, a tube through which said fume may be ejected, a source of compressed air, means for supplying compressed air to said mechanism, means for diverting to said first means a portion of the air supplied to said mechanism so as to form said fume and eject the same through said tube, means whereby said last-named means is effective for a lesser period than said mechanism, means for diverting to said tube still another portion of the air supplied to said mechanism for scavenging said tube, and means whereby said last-named means is rendered effective when said means for diverting air to form said fume is rendered ineffective.

9. A signal for ships and the like comprising a sound-producing mechanism adapted to be actuated by compressed air, means adapted to form a visible fume when mixed with air, a reservoir for said means, a source of compressed air, means for supplying said compressed air to said mechanism, a mixing chamber communicating with said reservoir at one end and open at the other end, means for admitting to said mixing chamber a portion of the air supplied to said mechanism for creating suction in said chamber to draw said first means into said chamber, and a thin baffle member having an aperture therethrough interposed between said reservoir and said chamber.

10. A signal for ships and the like comprising a sound-producing mechanism adapted to be actuated by compressed air, means adapted to form a visible fume when mixed with air, a reservoir for said means, a tube communicating with said reservoir through which said fume may be ejected, a source of compressed air, means for supplying compressed air to said mechanism, and means for diverting to said tube a portion of the air supplied to said mechanism so as to create suction above said reservoir to cause vaporization of said first means.

11. A signal for ships and the like comprising a sound-producing mechanism adapted to be actuated by compressed air, means adapted to form a visible fume when mixed with air, a reservoir for said means, a tube communicating with said reservoir through which said fume may be ejected, a source of compressed air, means for supplying compressed air to said mechanism, means for diverting to said tube a portion of the air supplied to said mechanism so as to create suction above said reservoir to cause vaporization of said first means, and a thin baffle member having an aperture therethrough interposed between said tube and said reservoir.

In testimony whereof I have affixed my signature.

CHESTER B. MILLS.